United States Patent
Kaneko (10) Patent No.: US 10,306,226 B2
(45) Date of Patent: May 28, 2019

(54) IMAGE ENCODING APPARATUS, IMAGE DECODING APPARATUS, AND CONTROL METHODS THEREFOR

(71) Applicant: CANON KABUSHIKI KAISHA, Tokyo (JP)

(72) Inventor: Yushi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 15/645,743

(22) Filed: Jul. 10, 2017

(65) Prior Publication Data

US 2018/0020217 A1 Jan. 18, 2018

(30) Foreign Application Priority Data

Jul. 12, 2016 (JP) .................................. 2016-137953

(51) Int. Cl.
*H04N 19/124* (2014.01)
*H04N 19/44* (2014.01)
*H04N 19/63* (2014.01)
*H04N 19/14* (2014.01)
*H04N 19/169* (2014.01)

(52) U.S. Cl.
CPC .......... *H04N 19/124* (2014.11); *H04N 19/14* (2014.11); *H04N 19/1883* (2014.11); *H04N 19/44* (2014.11); *H04N 19/63* (2014.11)

(58) Field of Classification Search
CPC .. H04N 19/124; H04N 19/14; H04N 19/1883; H04N 19/44; H04N 19/63
See application file for complete search history.

(56) References Cited

U.S. PATENT DOCUMENTS

| 7,016,546 B2* | 3/2006 | Fukuhara | H04N 19/176 375/240.19 |
| 2005/0025372 A1* | 2/2005 | Kim | H04N 19/63 382/240 |
| 2005/0212930 A1* | 9/2005 | Sim | G06T 1/0028 348/231.4 |

FOREIGN PATENT DOCUMENTS

JP 4254017 B 4/2009

* cited by examiner

*Primary Examiner* — Manuchehr Rahmjoo
(74) *Attorney, Agent, or Firm* — Cowan, Liebowitz & Latman, P.C.

(57) ABSTRACT

This invention provides a technique of efficiently encoding image data while especially suppressing a decrease in resolution caused by a difference in illuminance. An encoding apparatus includes a transforming unit which performs discrete wavelet transform for image data to be encoded up to preset decomposition level n (n≥2) to generate a plurality of sub-bands, a quantizing unit which quantizes coefficient data in the sub-bands of the respective decomposition levels, and an encoding unit which encodes the coefficient data. The quantizing unit quantizes each sub-band of decomposition level n based on a quantization parameter set for each sub-band, and quantizes each sub-band of decomposition level n−1 or less based on a quantization parameter set for each sub-band and a weighting coefficient dependent on coefficient data of a sub-band LL of decomposition level n.

6 Claims, 8 Drawing Sheets

IMAGE ENCODING APPARATUS, IMAGE DECODING APPARATUS, AND CONTROL METHODS THEREFOR

BACKGROUND OF THE INVENTION

Field of the Invention

The present invention relates to an encoding technique for image data.

Description of the Related Art

An encoding technique using discrete wavelet transform is known. The technique is represented by JPEG 2000. In JPEG 2000, discrete wavelet transform coefficient data is generated for each of a plurality of bands (sub-bands) from an image using discrete wavelet transform, quantized, and entropy-encoded, thereby obtaining compression-encoded data.

In an encoding method using the discrete wavelet transform technique, as for an image whose original image includes a high-illuminance portion (bright portion) and a low-illuminance portion (dark portion), if the compression ratio is increased, the resolution of the low-illuminance portion lowers, as compared with the resolution of the high-illuminance portion. This is caused by the fact that encoding at a high compression ratio of an image including a low-contrast low-illuminance portion leads a loss of the contrast.

To reduce such degradation in image quality, there is known a technique of extracting a region of interest called an ROI (Region Of Interest), assigning a large code amount to the region of interest, and encoding the region of interest at high quality. There is also known a method of dividing an image into a plurality of regions, extracting the image feature amount of each region, and performing different quantizing control for each region. See, for example, Japanese Patent No. 4254017.

In the method described in Japanese Patent No. 4254017, however, an image is divided into a plurality of regions and each region is encoded using a different quantization parameter. Thus, depending on the image, the division boundaries of the regions may be visually perceived, and the image may be a visually unnatural image. If the division size is made smaller, this problem may be reduced. However, a decrease in division size increases the number of divided regions, and the image feature amounts or quantization parameters for the respective regions, which need to be saved in encoded data, increase. This poses a problem that a code amount undesirably increases.

SUMMARY OF THE INVENTION

The present invention has been made in consideration of the above problem, and provides, when encoding an image using discrete wavelet transform, a technique of efficiently encoding image data while especially suppressing a decrease in resolution caused by a difference in illuminance.

According to an aspect of the invention, there is provided an image encoding apparatus for encoding image data, comprising: a transforming unit configured to perform discrete wavelet transform for image data to be encoded up to decomposition level 2 or more to generate a plurality of sub-bands; a quantizing unit configured to quantize coefficient data in the sub-bands obtained by the transforming unit; and an encoding unit configured to encode the coefficient data quantized by the quantizing unit, wherein the quantizing unit quantizes the sub-bands of a lower decomposition level based on the coefficient data of the low-frequency sub-band of a highest decomposition level.

According to the present invention, when encoding an image using discrete wavelet transform, it is possible to provide a technique of efficiently encoding image data while especially suppressing a decrease in resolution caused by a difference in illuminance.

Further features of the present invention will become apparent from the following description of exemplary embodiments (with reference to the attached drawings).

DESCRIPTION OF THE EMBODIMENTS

Embodiments of the present invention will be described in detail below with reference to the accompanying drawings.

First Embodiment

<Explanation of Encoding Apparatus>

Figure 1:
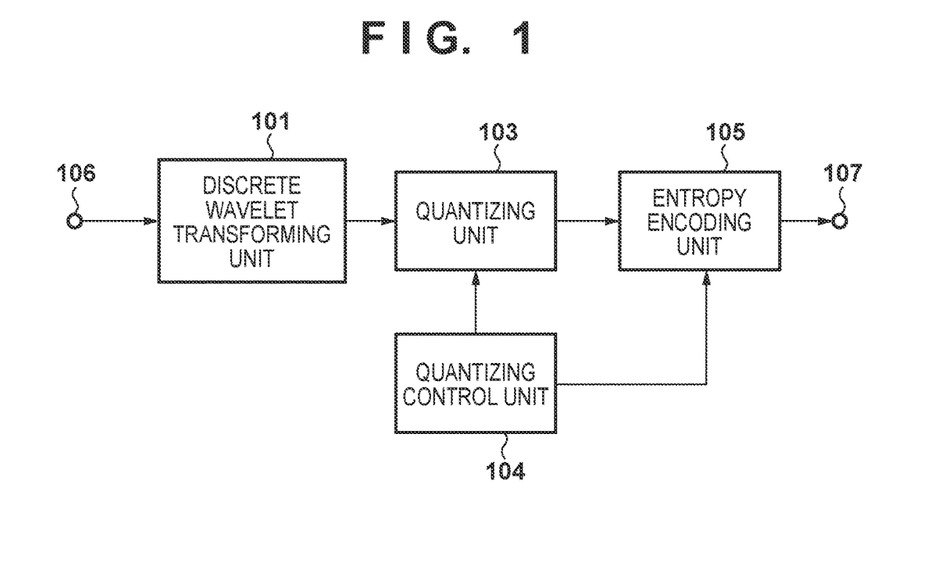
FIG. 1 is a block diagram showing the arrangement of an encoding apparatus according to the first embodiment.

FIG. 1 is a block diagram showing the arrangement of an image encoding apparatus according to the first embodiment. Referring to FIG. 1, image data to be encoded is supplied to a discrete wavelet transforming unit 101 via an input terminal 106. Note that any kind of source of image data to be encoded, which is connected to the input terminal 106, is used. For example, if the image encoding apparatus of this embodiment is implemented in a video camera, the source is an image capturing unit. Alternatively, the source may be a storage medium which stores image data.

The discrete wavelet transforming unit 101 performs discrete wavelet transform for the input image data, thereby generating discrete wavelet transform coefficient data of a plurality of sub-bands. In the discrete wavelet transform, a low-pass filter and a high-pass filter are sequentially applied in the vertical and horizontal directions of an image to divide image data into sub-bands (bands) of low-frequency components L and high-frequency components H, thereby generating discrete wavelet coefficients. One sub-band division operation generates low- and high-frequency coefficient data in each of the horizontal and vertical directions, thereby generating four sub-bands LL, LH, HL, and HH by combinations of the data. Each sub-band includes a plurality of coefficient data. In discrete wavelet transform, it is permitted to recursively perform sub-band division for the sub-band LL including low-frequency coefficient data in the horizontal and vertical directions. The sub-band division number will be referred to as a decomposition level hereinafter. Each sub-band obtained by performing sub-band division is represented by nXY where n represents a decomposition level, X represents a low-frequency component L or a high-frequency component H in the horizontal direction, and Y represents a low-frequency component L or a high-frequency component H in the vertical direction. In this embodiment, n is equal to or larger than a value of 2.

Figure 2:
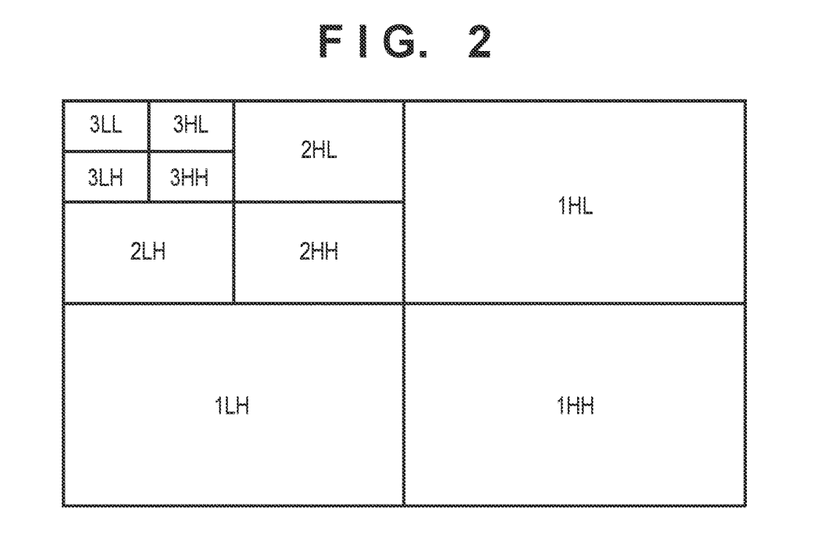
FIG. 2 is a view showing an example of an array of discrete wavelet coefficients.

FIG. 2 shows an array of sub-bands 1HH to 3LL obtained by performing sub-band division according to the first embodiment. In this embodiment, as shown in FIG. 2, sub-band division of decomposition level 3 is performed. Note that as described above, when executing discrete wavelet transform a plurality of times, the sub-band LL is to undergo discrete wavelet transform of the next decomposition level. Therefore, if discrete wavelet transform is performed the target number of times, one sub-band LL is obtained. This is the reason why there is only the sub-band 3LL as the sub-band LL, as shown in FIG. 2.

The discrete wavelet transforming unit 101 supplies, to a quantizing unit 103, the discrete wavelet coefficient data of the sub-bands 1HH to 3LL of decomposition levels 1 to 3, which have been obtained by performing transform. In the following description, the discrete wavelet coefficient data of the sub-band nXY is represented by TnXY. The meaning of each of n, X, and Y is as described above.

The quantizing unit 103 quantizes discrete wavelet coefficient data T1HH to T3LL based on quantization parameters for the respective sub-bands set from a quantizing control unit 104, thereby generating quantized coefficient data TQ1HH to TQ3LL. The quantizing unit 103 supplies the generated quantized coefficient data TQ1HH to TQ3LL to an entropy encoding unit 105.

Figure 4:
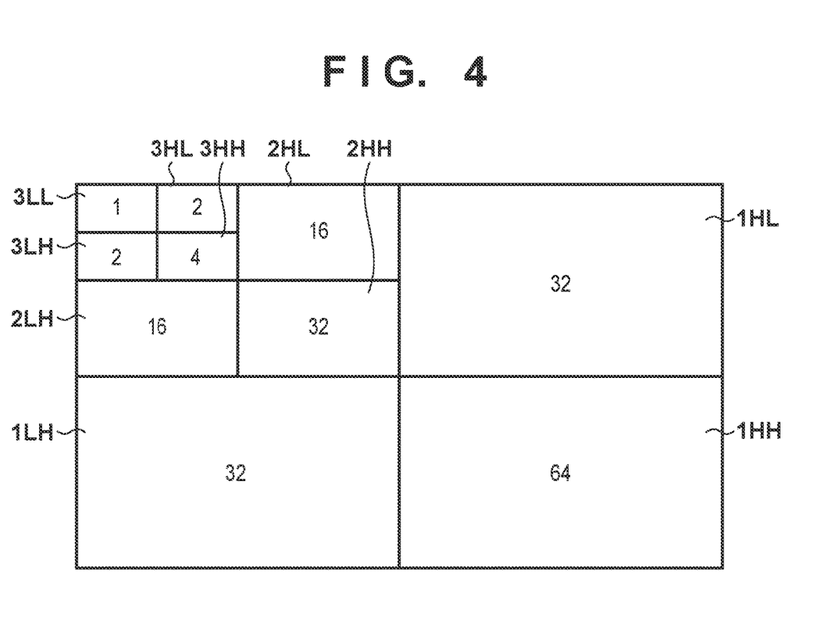
FIG. 4 is a view showing quantization parameters set by a quantizing control unit according to the first embodiment.

The quantization parameters set by the quantizing control unit 104 will be described with reference to FIG. 4. FIG. 4 is a view showing examples of the quantization parameters for the respective sub-bands. As shown in FIG. 4, as the decomposition level is lower, the quantization parameter is generally larger. Even at the same decomposition level, the quantization parameter is larger for the sub-band including more high-frequency components. Note that in this embodiment, as shown in FIG. 4, the quantization parameters are determined in advance for the respective sub-bands but may be determined in accordance with a result of analyzing the image data to be encoded or the discrete wavelet coefficient data, a target code amount, and the like.

The quantization parameter is a value serving as a reference of a quantization step in the quantizing unit (to be described later). For a low-frequency component for which degradation tends to be conspicuous, a small value is set to obtain a small quantization step. For a high-frequency component for which degradation tends not to be conspicuous, a large value is set to obtain a large quantization step. As a result, it is possible to achieve high image quality and reduce a code amount. Note that details of the quantizing unit 103 will be described later.

The entropy encoding unit 105 receives the coefficient data TQ1HH to TQ3LL quantized by the quantizing unit 103 and the quantization parameters for the respective sub-bands from the quantizing control unit 104, and entropy-encodes them. In entropy encoding, the redundancy of input data is deleted by a predetermined entropy encoding method. The encoded data obtained by performing encoding are supplied to an output terminal 107. The predetermined entropy encoding method is a lossless compression encoding method such as run length encoding, Huffman coding, or arithmetic coding. A recording unit (not shown) records, in a recording medium, via the output terminal 107, the encoded data output from the entropy encoding unit 105. Alternatively, a transmitting unit (not shown) may transmit the encoded data to a decoding apparatus.

Figure 3:
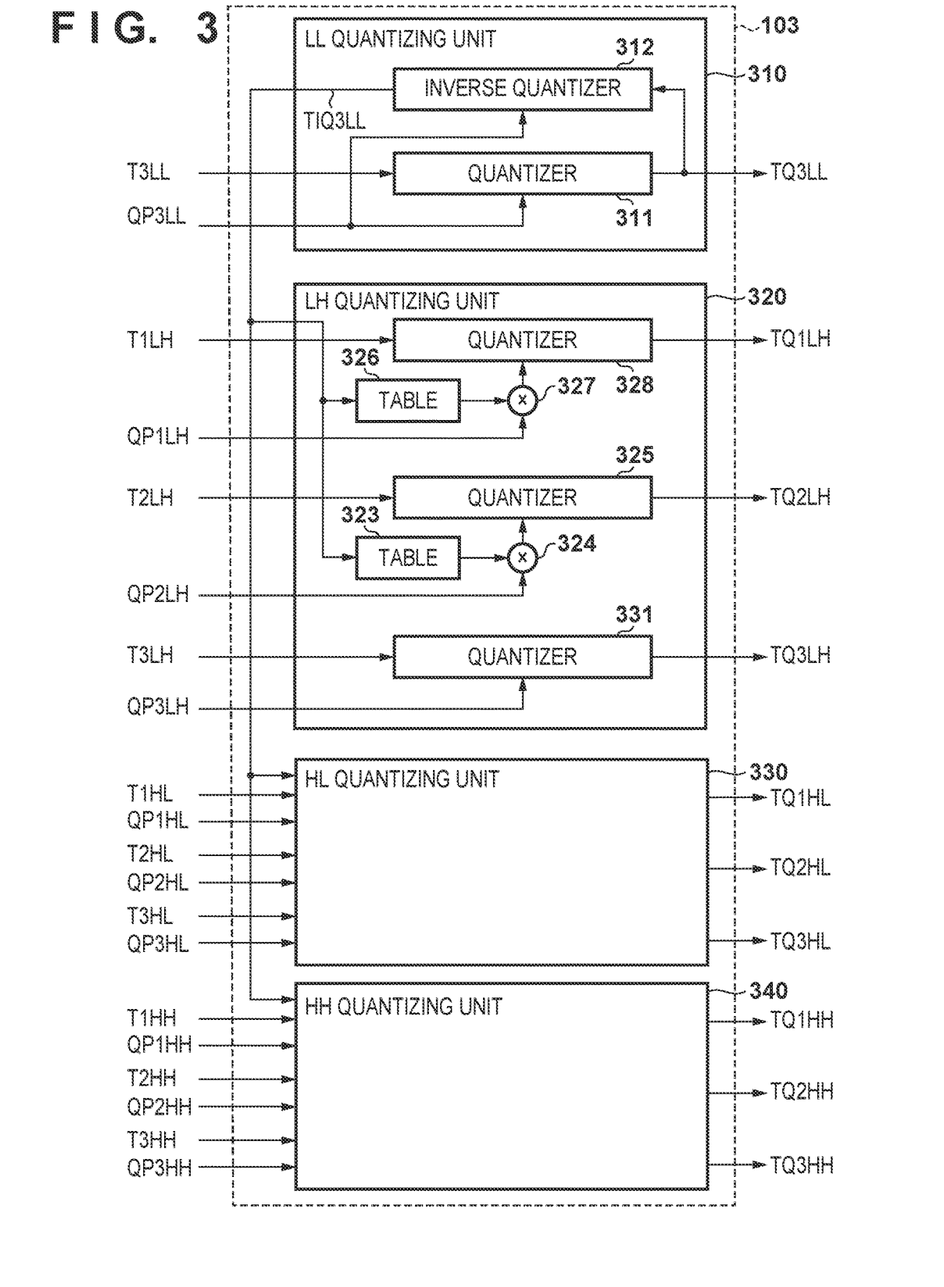
FIG. 3 is a block diagram showing the arrangement of a quantizing unit according to the first embodiment.

The arrangement and operation of the quantizing unit 103 according to the first embodiment will be described in detail. FIG. 3 is a block diagram showing the arrangement of the quantizing unit 103. As shown in FIG. 3, the quantizing unit 103 includes an LL quantizing unit 310, an LH quantizing unit 320, an HL quantizing unit 330, and an HH quantizing unit 340.

The LL quantizing unit 310 quantizes the discrete wavelet coefficient data T3LL. The LH quantizing unit 320 quantizes the discrete wavelet coefficient data TnLH (n=1, 2, 3). The HL quantizing unit 330 quantizes the discrete wavelet coefficient data TnHL. The HH quantizing unit 340 quantizes discrete wavelet coefficient data TnHH.

The LL quantizing unit 310 is supplied with the discrete wavelet coefficient data T3LL from the discrete wavelet transforming unit 101, and supplied with a quantization parameter QP3LL from the quantizing control unit 104. A quantizer 311 quantizes the discrete wavelet coefficient data T3LL of the sub-band 3LL using the quantization parameter QP3LL, thereby generating the quantized coefficient data TQ3LL. The quantizer 311 supplies the generated quantized coefficient data TQ3LL to the entropy encoding unit 105 and an inverse quantizer 312.

The inverse quantizer 312 inversely quantizes the quantized coefficient data TQ3LL using the same quantization parameter QP3LL as that used at the time of quantization, thereby obtaining discrete wavelet coefficient data TIQ3LL.

Note that when quantizing the discrete wavelet coefficient data TQ3LL, values below a preset digit (for example, the fractional portion) are discarded, and the discrete wavelet coefficient data TQ3LL and TIQ3LL are not always equal to each other. The reason why the discrete wavelet coefficient data TIQ3LL is generated is to perform the same processing as decoding processing in the decoding apparatus.

The inverse quantizer 312 supplies the inversely quantized discrete wavelet coefficient data TIQ3LL to each of the LH quantizing unit 320, the HL quantizing unit 330, and the HH quantizing unit 340.

The LH quantizing unit 320 quantizes the discrete wavelet coefficient data T1LH, T2LH, and T3LH of the sub-bands 1LH, 2LH, and 3LH of decomposition levels 1 to 3. Details of this processing will be described below.

The LH quantizing unit 320 receives the discrete wavelet coefficient data TnLH (=T1LH, T2LH, T3LH) from the discrete wavelet transforming unit 101, and receives the quantization parameters QPnLH (=QP1LH, QP2LH, QP3LH) from the quantizing control unit 104. The LH quantizing unit 320 also receives the inversely quantized discrete wavelet coefficient data TIQ3LL from the LL quantizing unit 310. The discrete wavelet coefficient data TIQ3LL is supplied to tables 326 and 323 in the LH quantizing unit 320.

The table 326 transforms the discrete wavelet coefficient data TIQ3LL into a weighting coefficient to be applied in quantization of the discrete wavelet coefficient data T1LH of the sub-band 1LH. A multiplier 327 multiplies the quantization parameter QP1LH by the weighting coefficient from the table 326, and outputs the quantization parameter to be used to quantize the discrete wavelet coefficient data T1LH. In other words, the multiplier 327 functions as a correcting unit for correcting the quantization parameter QP1LH for the sub-band 1LH in accordance with the weighting coefficient. A quantizer 328 quantizes the discrete wavelet coefficient data T1LH of the sub-band 1LH using the quantization parameter corrected by the multiplier 327, thereby generating the quantized coefficient data TQ1LH. The quantizer 328 outputs the generated quantized coefficient data TQ1LH to the entropy encoding unit 105.

The table 323 transforms the discrete wavelet coefficient data TIQ3LL into a weighting coefficient to be applied in quantization of the discrete wavelet coefficient data T2LH of the sub-band 2LH. A multiplier 324 multiplies the quantization parameter QP2LH by the weighting coefficient from the table 323, and outputs the quantization parameter to be used to quantize the discrete wavelet coefficient data T2LH. A quantizer 325 quantizes the discrete wavelet coefficient data T2LH of the sub-band 2LH using the quantization parameter from the multiplier 324, thereby generating the quantized coefficient data TQ2LH. The quantizer 325 outputs the generated quantized coefficient data TQ2LH to the entropy encoding unit 105.

A quantizer 331 quantizes the discrete wavelet coefficient data T3LH of the sub-band 3LH using the quantization parameter QP3LH, thereby generating the quantized coefficient data TQ3LH. The quantizer 331 outputs the generated quantized coefficient data TQ3LH to the entropy encoding unit 105.

The tables 326 and 323 are transform tables for transforming the discrete wavelet coefficient data TIQ3LL, obtained by quantizing and inversely quantizing the discrete wavelet coefficient data of decomposition level 3, into weighting coefficients to be used to quantize the discrete wavelet coefficient data T1LH and T2LH of decomposition levels 1 and 2, respectively.

The weighting coefficient is a coefficient for decreasing or increasing the quantization parameter set for each sub-band from the quantizing control unit 104 by multiplying the quantization parameter by the coefficient. Basically, as the value of the discrete wavelet coefficient data TIQ3LL is smaller, the weighting coefficient is set smaller (for example, a value smaller than one). As the value of the discrete wavelet coefficient data TIQ3LL is larger, the weighting coefficient is set larger (for example, a value equal to or larger than one).

Figure 5:
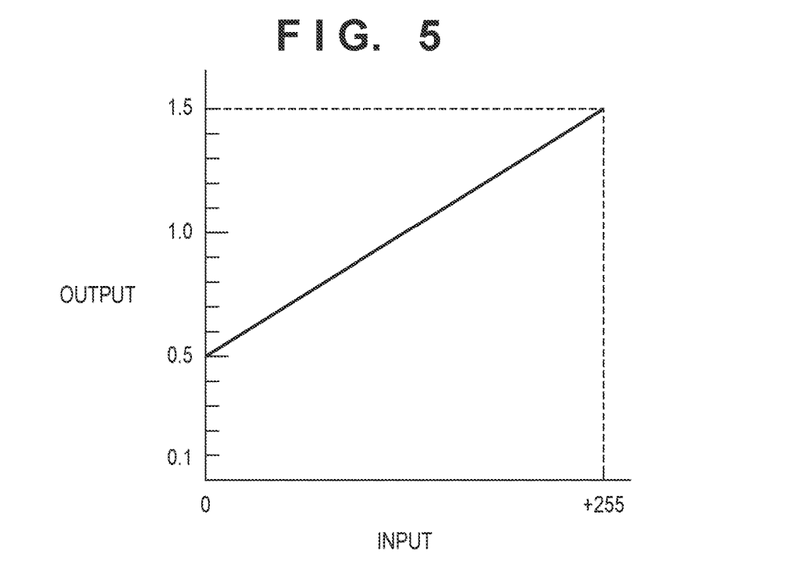
FIG. 5 is a graph showing an example of a weighting coefficient transform table according to the first embodiment.

FIG. 5 shows an example of the input/output characteristic of the tables 326 and 323. This is an example in which the discrete wavelet coefficient data TIQ3LL includes 8 bits (value: 0 to 255). As shown in FIG. 5, for an input range of 0 to 255, an output range of 0.5 to 1.5 is obtained. That is, the characteristic indicates that 0.5 is output when the discrete wavelet coefficient data TIQ3LL as an input value is small is small, and 1.5 is output when the discrete wavelet coefficient data TIQ3LL is large. Thus, for example, if the quantization parameter is set to 32, it is multiplied by the weighting coefficient (0.5 to 1.5) to change between 16 and 48.

It may be considered that the value of the discrete wavelet coefficient data TIQ3LL supplied from the LL quantizing unit 310 indicates the degree of brightness. That is, if the value indicated by the coefficient data is small, the portion is regarded as a low-illuminance portion. Conversely, if the value indicated by the coefficient data is large, the portion is regarded as a high-illuminance portion. Consequently, if the weighting coefficient of the input/output characteristic shown in FIG. 5 is generated, the quantization parameter becomes small at a low illuminance, and the tonality is readily maintained. Therefore, the resolution of the low-illuminance portion can be improved.

The weighting coefficients are applied to the discrete wavelet coefficients of the sub-bands 2LH and 1LH at the same coordinate position as that of the coefficient of the sub-band 3LL which has been used to generate the weighting coefficients.

Figure 6:
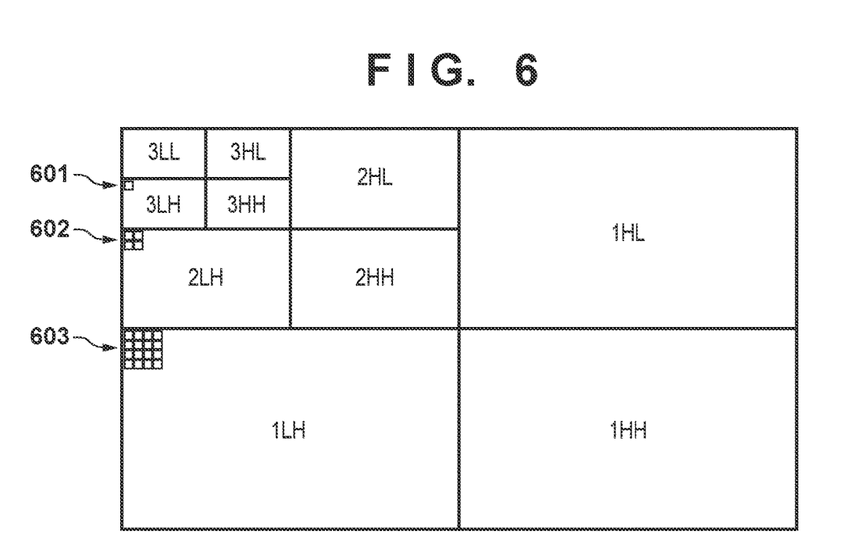
FIG. 6 is a view showing the positional relationship between the discrete wavelet coefficients according to the first embodiment.

The spatial positional relationship in an image between the discrete wavelet coefficients of the sub-bands 1LH, 2LH, and 3LH will be described with reference to FIG. 6. FIG. 6 is a view showing an array of the sub-bands 1HH to 3LL. When attention is paid to the sub-bands LH, reference numeral 601 denotes one coefficient data (to be referred to as coefficient data of interest hereinafter) in the sub-band of interest of decomposition level 3. Every time the decomposition level in discrete wavelet transform decreases, the number of discrete wavelet coefficients becomes twice in the horizontal and vertical directions. Therefore, in correspondence with the one coefficient data 601 of interest of the sub-band 3LH, there are 2×2 coefficient data denoted by reference numeral 602 at the same special coordinates in the sub-band 2LH. Furthermore, in correspondence with the coefficient data 601 of interest, there are 4×4 coordinate data denoted by reference numeral 603 at the same spatial coordinates in the sub-band 1LH.

That is, the weighting coefficients generated from the one discrete wavelet coefficient 601 of the sub-band 3LH are applied to the 2×2 coefficients 602 of the sub-band 2LH and the 4×4 coefficients 603 of the sub-band 1LH.

With the series of operations, the LH quantizing unit 320 performs quantization by changing the quantization parameters of the sub-bands 1LH and 2LH by the weighting coefficients generated from the discrete wavelet coefficient of the sub-band 3LL. As the discrete wavelet coefficient TIQ3LL in the sub-band 3LL is smaller, the quantization parameters of the sub-bands 1LH and 2LH are smaller, and quantization is then performed by small quantization steps.

The LH quantizing unit 320 has been explained above. The arrangements and operations of the HL quantizing unit 330 and HH quantizing unit 340 are the same as those of the LH quantizing unit 320. That is, these arrangements and operations will be understood by replacing "LH" in the above description of the LH quantizing unit 320 with "HL" or "HH". Therefore, similarly to the LH quantizing unit 320, each of the HL quantizing unit 330 and the HH quantizing unit 340 generates weighting coefficients from the discrete wavelet coefficient TIQ3LL of decomposition level 3, and adjusts the quantization parameters of decomposition levels 2 and 1, thereby performing quantization.

<Explanation of Decoding Apparatus>

Figure 7:
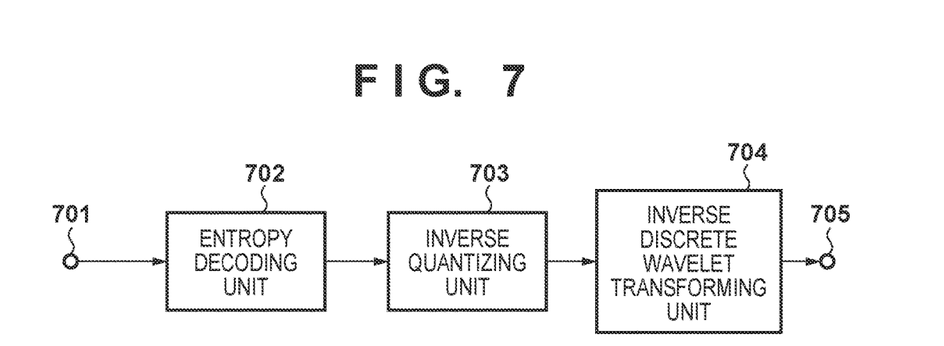
FIG. 7 is a block diagram showing the arrangement of a decoding apparatus according to the first embodiment.

FIG. 7 is a block diagram showing the arrangement of the image decoding apparatus according to this embodiment. Encoded image data generated by a data source (not shown) is supplied to an entropy decoding unit 702 via an input terminal 701. The encoded image data source connected to the input terminal 701 may be of any type. For example, the source may be connected to the above-described image encoding apparatus directly, or may be a storage medium storing the encoded image data output from the image encoding apparatus.

The entropy decoding unit 702 decodes the quantized coefficient data TQ1HH to TQ3LL and the quantization parameters QP1HH to QP3LL from the input encoded data by a predetermined entropy decoding method, and supplies the obtained data to an inverse quantizing unit 703.

The inverse quantizing unit 703 inversely quantizes the quantized coefficient data TQ1HH to TQ3LL using the quantization parameters QP1HH to QP3LL, and supplies the obtained data to an inverse discrete wavelet transforming unit 704 as the discrete wavelet coefficient data TIQ1HH to TIQ3LL. Details of the inverse quantizing unit 703 will be described later.

The inverse discrete wavelet transforming unit 704 performs inverse discrete wavelet transform using the discrete wavelet coefficient data TIQ1HH to TIQ3LL from the inverse quantizing unit 703 to generate image data, and outputs the image data to an output apparatus such as an external display device (not shown) via an output terminal 705.

Figure 8:
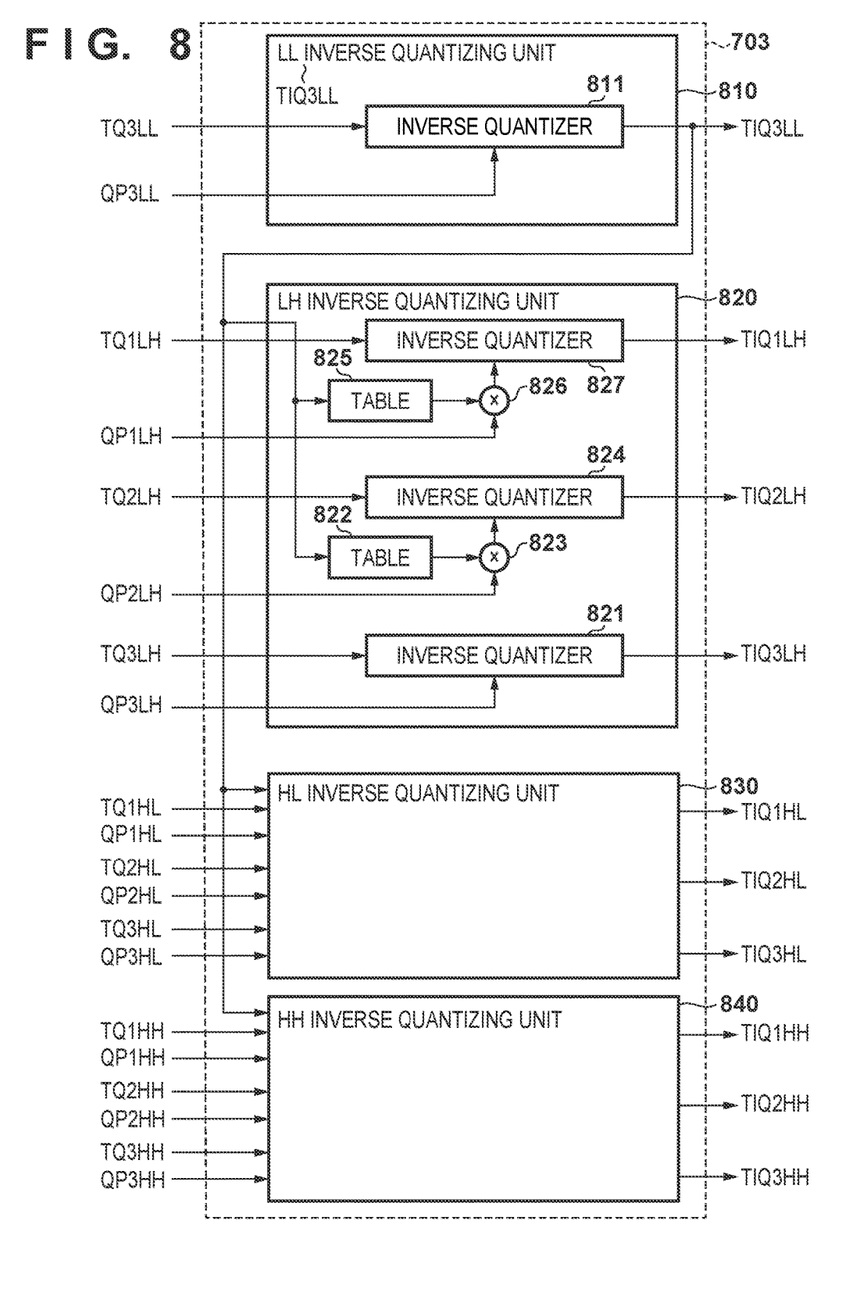
FIG. 8 is a block diagram showing the arrangement of an inverse quantizing unit according to the first embodiment.

The arrangement and operation of the inverse quantizing unit 703 according to the embodiment will be described below. FIG. 8 is a block diagram showing the arrangement of the inverse quantizing unit 703. As shown in FIG. 8, the inverse quantizing unit 703 includes an LL inverse quantizing unit 810, an LH inverse quantizing unit 820, an HL inverse quantizing unit 830, and an HH inverse quantizing unit 840.

The LL inverse quantizing unit 810 inversely quantizes the quantized coefficient data TQ3LL of the sub-band 3LL, as follows.

The entropy decoding unit 702 supplies the quantized coefficient data TQ3LL and the quantization parameter QP3LL to the LL inverse quantizing unit 810. An inverse quantizer 811 inversely quantizes the quantized coefficient data TQ3LL using the quantization parameter QP3LL, thereby generating the discrete wavelet coefficient data TIQ3LL. The inverse quantizer 811 supplies the generated discrete wavelet coefficient data TIQ3LL to the inverse discrete wavelet transforming unit 704.

The LH inverse quantizing unit 820 inversely quantizes the LH components of decomposition levels 1 to 3, as follows.

The entropy decoding unit 702 supplies the quantized coefficient data TQ1LH, TQ2LH, and TQ3LH and the quantization parameters QP1LH, QP2LH, and QP3LH to the LH inverse quantizing unit 820. In addition, the discrete wavelet coefficient data TIQ3LL from the LL inverse quantizing unit 810 is supplied to the LH inverse quantizing unit 820. The discrete wavelet coefficient data TIQ3LL obtained by inverse quantization of the LL inverse quantizing unit 810 is supplied to tables 825 and 822 in the LH inverse quantizing unit 820.

The table 825 transforms the discrete wavelet coefficient data TIQ3LL into a weighting coefficient to be used to inversely quantize the quantized coefficient data TQ1LH of the sub-band 1LH. A multiplier 826 generates a quantization parameter to be used to inversely quantize the quantized coefficient data TQ1LH by multiplying the quantization parameter QP1LH by the weighting coefficient from the table 825, and supplies the generated quantization parameter to an inverse quantizing unit 827.

The inverse quantizing unit 827 inversely quantizes the quantized coefficient data TQ1LH of the sub-band 1LH using the quantization parameter from the multiplier 826, thereby generating the discrete wavelet coefficient data TIQ1LH. The inverse quantizing unit 827 supplies the generated discrete wavelet coefficient data TIQ1LH to the inverse discrete wavelet transforming unit 704.

An inverse quantizer 821 inversely quantizes the quantized coefficient data TQ3LH of the sub-band 3LH using the quantization parameter QP3LH, thereby generating the discrete wavelet coefficient data T3LH. The inverse quantizer 821 supplies the generated discrete wavelet coefficient data T3LH to the inverse discrete wavelet transforming unit 704.

The table 822 transforms the discrete wavelet coefficient data TIQLL into a weighting coefficient to be used to inversely quantize the quantized coefficient data TQ2LH of the sub-band 2LH. A multiplier 823 generates a quantization parameter to be used to inversely quantize the quantized coefficient data TQ2LH by multiplying the quantization parameter QP2LH by the weighting coefficient from the table 822, and supplies the generated quantization parameter to an inverse quantizer 824. The inverse quantizer 824 inversely quantizes the quantized coefficient data TQ2LH of the sub-band 2LH using the quantization parameter from the multiplier 823, thereby generating the discrete wavelet coefficient data TIQ2LH. The inverse quantizer 824 then supplies the generated discrete wavelet coefficient data TIQ2LH to the inverse discrete wavelet transforming unit 704.

The tables 825 and 822 are transform tables for transforming the discrete wavelet coefficient, obtained by inversely quantizing the quantized coefficient data of decomposition level 3, into weighting coefficients to be used to inversely quantize the quantized coefficient data of decomposition levels 1 and 2, respectively. The output values of the tables 825 and 822 with respect to the input value are the same as those of the tables 326 and 323 of the quantizing unit shown in FIG. 3, respectively. The weighting coefficients are applied to the quantized coefficient data of the sub-bands 2LH and 1LH at the same coordinate position as that of the discrete wavelet coefficient data of the sub-band 3LL which has been used to generate the weighting coefficients.

With the series of operations, the LH inverse quantizing unit 820 performs inverse quantization by changing the quantization parameters of the sub-bands 1LH and 2LH by the weighting coefficients generated from the quantized coefficient of the sub-band 3LL. Since the weighting coefficients are generated from the quantized coefficient of the sub-band 3LL, they have completely the same values as those of the weighting coefficients of the quantizing unit in the encoding apparatus, and inverse quantization is performed using the same quantization parameters as those used at the time quantization.

The LH inverse quantizing unit 820 has been explained above. The arrangements and operations of the HL inverse quantizing unit 830 and HH inverse quantizing unit 840 are the same as those of the LH inverse quantizing unit 820. Therefore, a description of the arrangements and operations of the HL inverse quantizing unit 830 and HH inverse quantizing unit 840 will be omitted.

As described above, the quantizing unit 103 and the inverse quantizing unit 703 generate final quantization parameters by transforming the inversely quantized discrete wavelet coefficient as a DC component of the sub-band LL of decomposition level 3 into weighting coefficients at the times of quantization and inverse quantization of the AC components of the sub-bands LH, HL, and HH of the respective decomposition levels, and respectively multiplying the quantization parameters set from the quantizing control unit by the weighting coefficients.

Note that in the above description, the tables 323, 326, 822, and 825 for transforming into weighting coefficients have linear characteristics. The present invention is not limited to this. The tables may have nonlinear characteristics, or the tables 323 and 326 may have different characteristics. However, assume that the tables 323 and 822 have the same characteristic and the tables 326 and 825 have the same characteristic.

The embodiment has explained an example in which discrete wavelet transform is executed three times to generate coefficient data of the sub-bands of decomposition level 3. However, the number of times of execution of discrete wavelet transform is not limited to three. That is, when the number of times of execution of discrete wavelet transform is defined by n (n≥2), the quantizing unit 103 performs quantization for each sub-band of decomposition level n based on the quantization parameter set for each sub-band. For each sub-band of decomposition level n−1 or less, the quantizing unit 103 need only perform quantization based on the quantization parameter set for each sub-band and a weighting coefficient dependent on coefficient data in the sub-band LL of decomposition level n.

The tables 326, 323, 822, and 825 described in the embodiment have been explained as those for generating weighting coefficients of the input/output shown in FIG. 5. Consider a case in which the above-described image encoding apparatus is implemented in an image capturing apparatus such as a video camera. In this case, the outputs of the tables 326 and 323 may be fixed to "1.0" depending on an image capturing target and image capturing conditions. That is, switching to a mode of performing quantization without correcting the quantization parameters QP1LH and QP2LH may be allowed. The user operates an operation unit (not shown) to perform this switching operation. If the outputs of the tables 326 and 323 are fixed to "1.0", information indicating that the outputs are fixed to "1.0" is stored in the header of the encoded data. If the header of the encoded data includes this information, the decoding apparatus performs decoding by fixing the outputs of the tables 822 and 825 to "1.0".

Modification of First Embodiment

An example in which the above first embodiment is implemented when the processor (CPU) of an information processing apparatus such as a personal computer executes an application program stored in a memory will be described as a modification. The arrangement of the information processing apparatus is the same as that of a personal computer and a description thereof will be omitted. Note that the representations of the respective sub-bands and coefficient data are the same as in the first embodiment. This modification also assumes that the number of times of execution of discrete wavelet transform is three.

Figure 11:
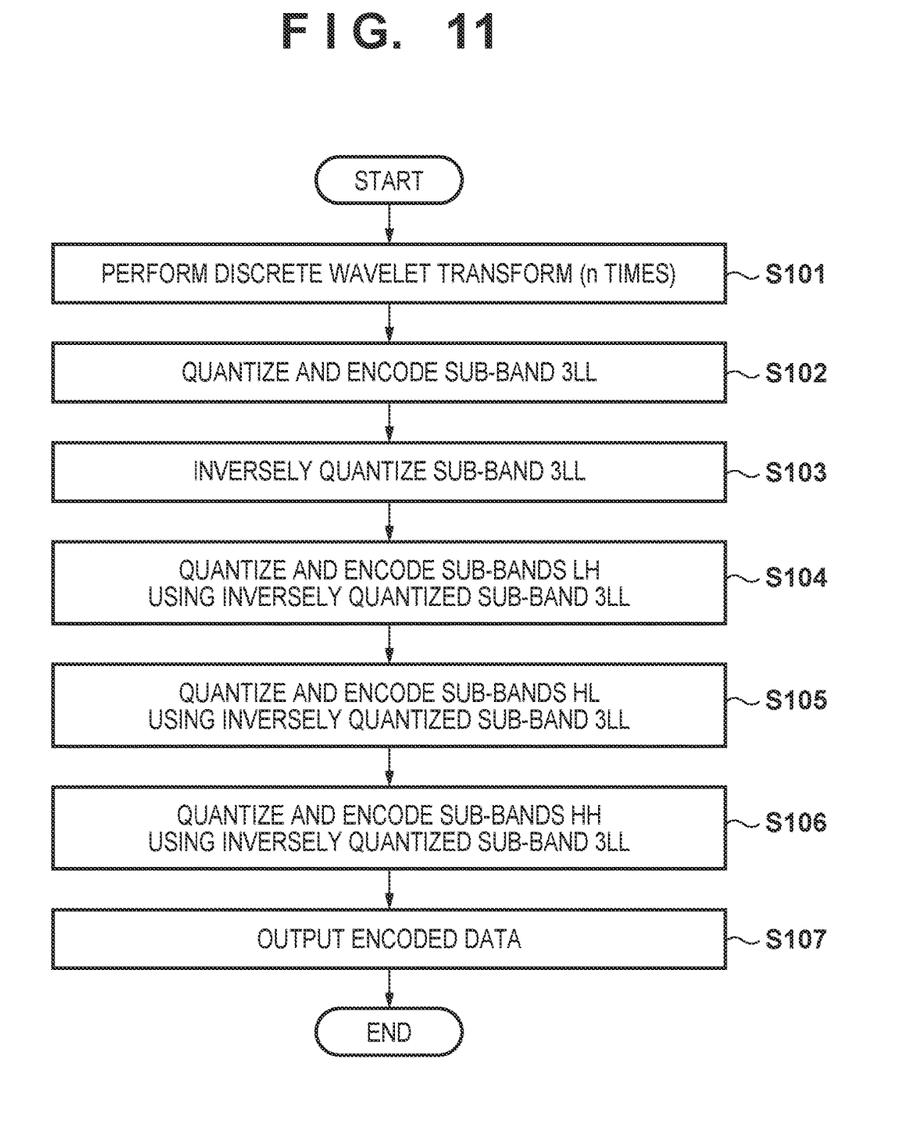
FIG. 11 is a flowchart illustrating an image encoding processing procedure according a modification of the first embodiment.

FIG. 11 is a flowchart illustrating the procedure of encoding processing in the application program.

In step S101, the CPU performs discrete wavelet transform n times for image data to be encoded. As a result, the sub-bands 3LL, 3HL, 3LH, 3HH, . . . , 1HL, 1LH, and 1HH are obtained.

In step S102, the CPU quantizes the coefficient data T3LL of the sub-band 3LL using the given quantization parameter QP3LL, thereby obtaining the quantized data TQ3LL. The CPU encodes the quantized data TQ3LL to generate encoded data of the sub-band 3LL. The obtained encoded data is temporarily stored in the memory.

In step S103, the CPU inversely quantizes the quantized coefficient data of the sub-band 3LL, thereby obtaining the inversely quantized coefficient data TIQ3LL.

In step S104, the CPU performs quantization and encoding of the sub-bands LH using the inversely quantized coefficient data TIQ3LL. Details of this processing will be described below.

The CPU quantizes the coefficient data T3LH of the highest decomposition level among the coefficient data TnLH using the given quantization parameter QP3LH, thereby generating the quantized coefficient data TQ3LH. The CPU encodes the coefficient data TQ3LH, and temporarily stores the obtained encoded data in the memory.

Furthermore, the CPU obtains the quantized coefficient data TQ2LH by quantizing the coefficient data T2LH of a decomposition level lower than that of the coefficient data T3LH using a corrected quantization parameter QP'2LH given by:

$$QP'2LH = QP2LH \times f(TIQ3LL)$$

The CPU then encodes the obtained coefficient data RQ2LH, and temporarily stores the obtained encoded data in the memory.

The CPU quantizes the coefficient data T1LH using a corrected quantization parameter QP'1LH given by:

$$QP'1LH = QP1LH \times f(TIQ3LL)$$

The CPU encodes the obtained coefficient data RQ2LH, and temporarily stores the obtained encoded data in the memory.

Note that the function f( ) used to correct the quantization parameter will be understood as a function of performing transform equivalent to that of the table 323 or 326 described in the first embodiment.

The processing contents in step S104 executed by the CPU has been explained above.

In step S105, the CPU performs quantization and encoding of the coefficient data T3HL, T2HL, and T1HL of the sub-bands LH using the inversely quantized coefficient data TIQ3LL. In step S106, the CPU performs quantization and encoding of the coefficient data T3HH, T2HH, and T1HH of the sub-bands HH using the inversely quantized coefficient data TIQ3LL. The processes in steps S105 and S106 are the same as that in step S104 except for the sub-bands to be processed, and a description thereof will be omitted.

In step S107, the CPU concatenates, in a preset order, the encoded data of the respective sub-bands stored in the memory, and outputs the obtained data.

The image data encoding processing has been explained above. Encoded data decoding (decompression) processing will be described next with reference to a flowchart shown in FIG. 12.

Figure 12:
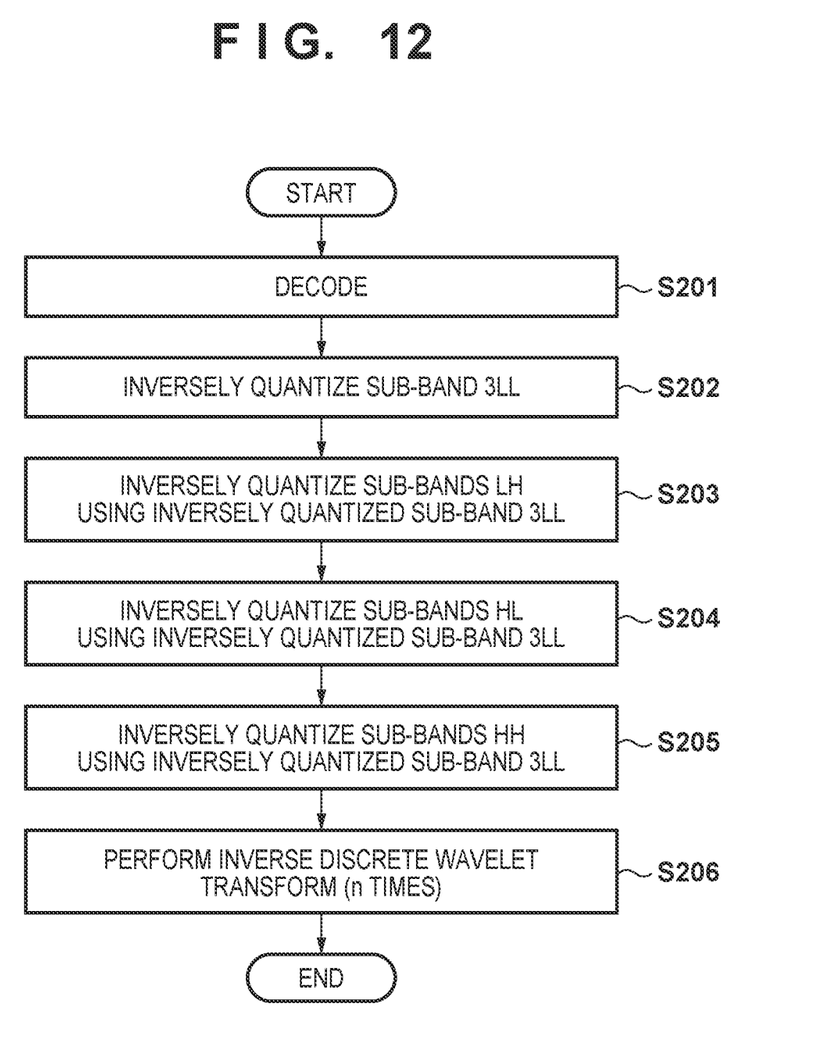
FIG. 12 is a flowchart illustrating an image decoding processing procedure according to the modification of the first embodiment.

In step S201, the CPU decodes the encoded data, and obtains the coefficient data of the respective sub-bands.

In step S202, the CPU inversely quantizes the coefficient data TQ3LL of the sub-band 3LL using the quantization parameter QP3LL, thereby obtaining the inversely quantized coefficient data TIQ3LL.

In step S203, the CPU inversely quantizes the sub-bands LH using the inversely quantized coefficient data TIQ3LL. Details of this processing will be described below.

The CPU inversely quantizes the coefficient data TQ3LH of the highest decomposition level among the coefficient data TQnLH using the given quantization parameter QP3LH, and temporarily stores the obtained inversely quantized coefficient data TIQ3LH in the memory.

Furthermore, the CPU inversely quantizes the coefficient data TQ2LH of a decomposition level lower than that of the coefficient data TQ3LH using the corrected quantization parameter QP'2LH given by:

$$QP'2LH=QP2LH \times f(TIQ3LL)$$

The CPU temporarily stores the obtained inversely quantized coefficient data TIQ2LH in the memory.

The CPU inversely quantizes the coefficient data TQ1LH using the corrected quantization parameter QP'1LH given by:

$$QP'1LH=QP1LH \times f(TIQ3LL)$$

The CPU temporarily stores the obtained inversely quantized coefficient data TIQ1LH in the memory. The function f( ) is the same as that used at the time of encoding.

The processing contents in step S203 executed by the CPU have been explained above.

In step S204, the CPU inversely quantizes the coefficient data TQ3HL, TQ2HL, and TQ1HL of the sub-bands HL using the inversely quantized coefficient data TIQ3LL. In step S205, the CPU performs inverse quantization and encoding of the coefficient data TQ3HH, TQ2HH, and TQ1HH of the sub-bands HH using the inversely quantized coefficient data TIQ3LL. The processes in steps S204 and S205 are the same as that in step S203 except for the sub-bands to be processed, and a description thereof will be omitted.

In step S206, the CPU performs inverse discrete wavelet transform for the coefficient data of each sub-band stored in the memory three times, thereby generating image data.

As described above, when the CPU executes the computer program, it is possible to obtain the same effects as in the first embodiment. Note that an embodiment to be described below may be implemented by executing the computer program, similarly to the modification.

Second Embodiment

The second embodiment will be described next. The differences between the first and second embodiments are a quantizing unit and inverse quantizing unit. In the first embodiment, quantization/inverse quantization operations of the respective sub-bands are parallelly performed. To the contrary, in the second embodiment, a quantization/inverse quantization operation is performed in an order from a low-frequency sub-band to a high-frequency sub-band in time series. The remaining discrete wavelet transforming unit, inverse discrete wavelet transforming unit, entropy encoding unit, entropy decoding unit, and quantizing control unit are the same and a description thereof will be omitted. Note that the order from the low-frequency sub-band to the high-frequency sub-band is an order of 3LL→{3HL, 3LH, 3HH}→{2HL, 2LH, 2HH}→{1HL, 1LH, 1HH}. The order of the sub-bands in { } is arbitrary.

<Explanation of Encoding Apparatus>

Figure 9:
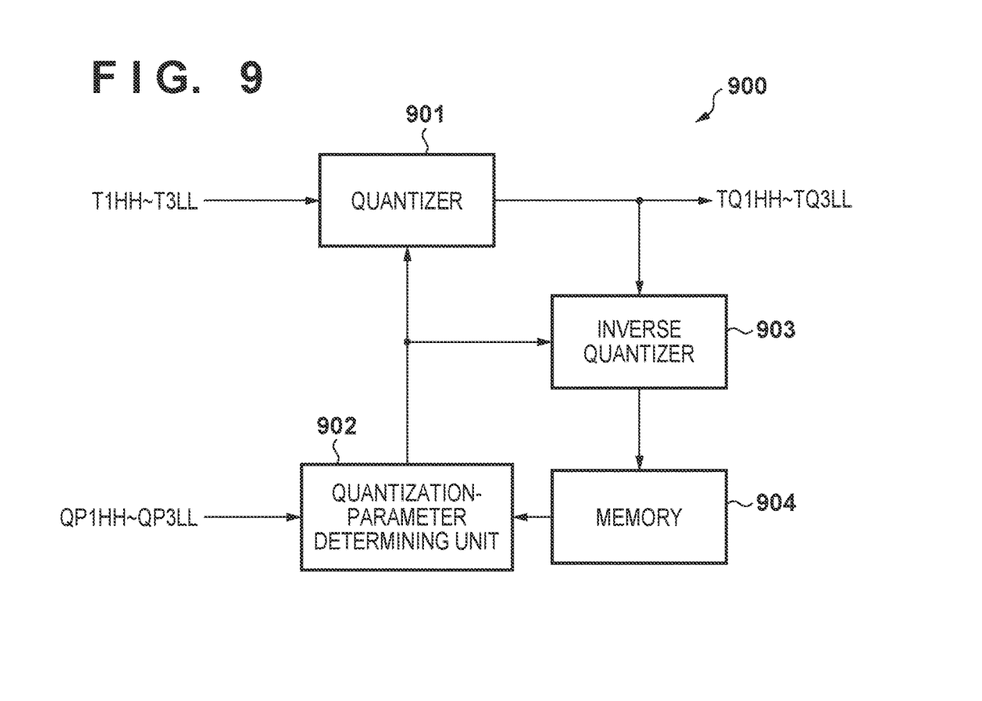
FIG. 9 is a block diagram showing the arrangement of a quantizing unit according to the second embodiment.

FIG. 9 is a block diagram showing a quantizing unit in an image encoding apparatus according to the second embodiment. Referring to FIG. 9, a quantizing unit 900 corresponds to the quantizing unit 103 of FIG. 1. The quantizing unit 900 is formed by a quantizer 901, a quantization-parameter determining unit 902, an inverse quantizer 903, and a memory 904.

The quantizer 901 is supplied with discrete wavelet coefficients from a discrete wavelet transforming unit 101 and supplied with quantization parameters from the quantization-parameter determining unit 902 (to be described later). The quantizer 901 quantizes each of the discrete wavelet coefficient data input in time series for the respective sub-bands using the quantization parameter from the quantization-parameter determining unit 902. The quantized coefficient data is externally output, and is also input to the inverse quantizer 903.

The inverse quantizer 903 inversely quantizes the quantized coefficient data using the same quantization parameter as that used at the time of quantization. The discrete wavelet coefficient obtained by inverse quantization is input to the memory 904.

The quantization-parameter determining unit 902 determines a final quantization parameter by a different method for each sub-band using the quantization parameter from a quantizing control unit 104 and the discrete wavelet coefficient from the memory 904, and outputs the determined quantization parameter to the quantizer 901 and the inverse quantizer 903.

The overall operation of the quantizing unit 900 will be described in detail below. As described above, the quantizing unit 900 performs quantization processing in time series in the order from the low-frequency sub-band to the high-frequency sub-band. Therefore, quantization is performed by different processing for each sub-band.

Discrete wavelet coefficient data T3LL to T3HH of LL, LH, HL, and HH components, as low-frequency components, of decomposition level 3 and quantization parameters QP3LL to QP3HH of the sub-bands LL, LH, HL, and HH of decomposition level 3 are sequentially input to the quantizing unit 900. In quantization of decomposition level 3, the quantization-parameter determining unit 902 outputs the input quantization parameters to the quantizer 901 intact. Coefficient data TQ3LL to TQ3HH quantized by the quantizer 901 are externally output. Discrete wavelet coefficient data TIQ3LL of the sub-band LL components of decomposition level 3, which has been inversely quantized by the inverse quantizer 903, is written and stored in the memory 904.

Next, discrete wavelet coefficient data T2LH to T2HH of the sub-band LH, HL, and HH components, as medium-frequency components, of decomposition level 2 and quantization parameters QP2LH to QP2HH of the sub-bands LH, HL, and HH of decomposition level 2 are sequentially supplied to the quantizing unit 900. On the other hand, the stored discrete wavelet coefficient data of the sub-band LL of decomposition level 3 is read out from the memory 904, and supplied to the quantization-parameter determining unit 902. The quantization-parameter determining unit 902 transforms, into a weighting coefficient, the discrete wavelet coefficient data of decomposition level 3 input from the memory 904. This corresponds to table b described in the first embodiment. As the discrete wavelet coefficient is smaller, the weighting coefficient is set smaller (for example, a value equal to or smaller than one). As the discrete wavelet coefficient is larger, the weighting coefficient is set larger (for example, a value equal to or larger than one). Then, the quantization parameter input from the quantizing control unit is multiplied by the weighting coefficient, thereby outputting the obtained quantization parameter as a final quantization parameter. The quantizer 901 externally outputs the quantized coefficient data TQ2LH to TQ2HH obtained by performing quantization. In the processing of decomposition level 2, the inverse quantizer 903 need not be operated and may be stopped. Note that the weighting coefficient is applied to the discrete wavelet coefficients of decomposition level 2 at the same coordinate position as that of the coefficient of decomposition level 3 which has been used to generate the weighting coefficient.

Discrete wavelet coefficient data T1LH to T1HH of the sub-band LH, HL, and HH components, as high-frequency components, of decomposition level 1 and quantization parameters QP1LH to QP1HH of the sub-bands LH, HL, and HH of decomposition level 1 are sequentially supplied to the quantizing unit 900. On the other hand, the stored discrete wavelet coefficient data of the sub-band LL of decomposition level 3 is read out from the memory 904, and supplied to the quantization-parameter determining unit 902. The quantization-parameter determining unit 902 transforms, into a weighting coefficient, the discrete wavelet coefficient data of decomposition level 3 input from the memory 904. This corresponds to table a described in the first embodiment. As the discrete wavelet coefficient is smaller, the weighting coefficient is set smaller (for example, a value equal to or smaller than one). As the discrete wavelet coefficient is larger, the weighting coefficient is set larger (for example, a value equal to or larger than one). Then, the quantization parameter supplied from the quantizing control unit is multiplied by the weighting coefficient, thereby outputting the obtained quantization parameter as a final quantization parameter. The quantizer 901 externally outputs the coefficient data TQ1LH to TQ1HH quantized by the quantizer 901. In the processing of decomposition level 1, the inverse quantizer 903 need not be operated and may be stopped. Note that the weighting coefficient is applied to the discrete wavelet coefficients of decomposition level 1 at the same coordinate position as that of the coefficient of decomposition level 3 which has been used to generate the weighting coefficient.

<Explanation of Decoding Apparatus>

Figure 10:
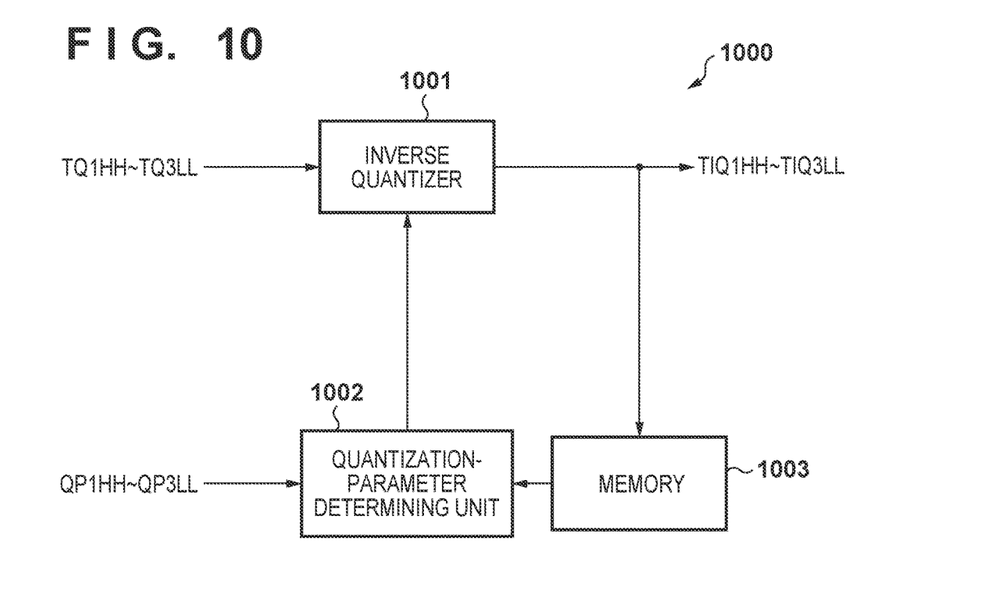
FIG. 10 is a block diagram showing the arrangement of an inverse quantizing unit according to the second embodiment.

FIG. 10 is a block diagram showing an inverse quantizing unit 1000 according to the second embodiment. The inverse quantizing unit 1000 corresponds to the inverse quantizing unit 703 according to the first embodiment. The inverse quantizing unit 1000 is formed by an inverse quantizer 1001, a quantization-parameter determining unit 1002, and a memory 1003.

Quantized coefficients from an entropy decoding unit 702 and quantization parameters from the quantization-parameter determining unit 1002 are supplied to the inverse quantizer 1001. The inverse quantizer 1001 inversely quantizes each of the quantized coefficient data input in time series for the respective sub-bands using the quantization parameter from the quantization-parameter determining unit 1002. The discrete wavelet coefficient data obtained by inverse quantization is externally output, and is also supplied to the memory 1003 and held in it.

The quantization-parameter determining unit 1002 determines a final quantization parameter by a different method for each sub-band using the quantization parameter from the entropy decoding unit 702 and the discrete wavelet coefficient data from the memory 1003, and supplies the determined quantization parameter to the inverse quantizer 1001.

The overall operation of the inverse quantizing unit 1000 will be described in detail below. As described above, the inverse quantizing unit 1000 performs inverse quantization processing in time series in an order from the low-frequency sub-band to the high-frequency sub-band. Therefore, inverse quantization is performed by different processing for each sub-band, as follows.

Quantized coefficient data TQ3LL to TQ3HH of the sub-band LL, LH, HL, and HH components, as low-frequency components, of decomposition level 3 and the quantization parameters QP3LL to QP3HH of the sub-bands LL, LH, HL, and HH of decomposition level 3 are sequentially supplied to the inverse quantizing unit 1000. In quantization of decomposition level 3, the quantization-parameter determining unit 1002 outputs the input quantization parameters to the inverse quantizer 1001 intact. The discrete wavelet coefficient data TIQ3LL to TIQ3HH obtained by performing inverse quantization in the inverse quantizer 1001 are externally output. The discrete wavelet coefficient data TIQ3LL of the sub-band LL components of decomposition level 3 is written and held in the memory 1004.

Next, the quantized coefficient data TQ2LH to TQ2HH of the sub-band LH, HL, and HH components, as medium-frequency components, of decomposition level 2 and the quantization parameters QP2LH to QP2HH of the sub-bands LH, HL, and HH of decomposition level 2 are sequentially supplied to the inverse quantizing unit 1000. On the other hand, the stored discrete wavelet coefficient data of the sub-band LL of decomposition level 3 is read out from the memory 1003, and input to the quantization-parameter determining unit 1002. The quantization-parameter determining unit 1002 transforms, into a weighting coefficient, the discrete wavelet coefficient data of decomposition level 3 input from the memory 1003. Similarly to the quantization-parameter determining unit 902 of the quantizing unit 900, the quantization-parameter determining unit 1002 sets a smaller value (for example, a value equal to or smaller than one) as the discrete wavelet coefficient is smaller, and sets a larger value (for example, a value equal to or larger than one) as the discrete wavelet coefficient is larger. Then, the quantization-parameter determining unit 1002 multiplies the quantization parameter input from the quantizing control unit by the weighting coefficient, thereby supplying the obtained quantization parameter to the inverse quantizer 1001 as a final quantization parameter. The discrete wavelet coefficient data TIQ2LH to TIQ2HH obtained by performing inverse quantization in the inverse quantizer 1001 are externally output. In the processing of decomposition level 2, no data is written in the memory 1003. Note that the weighting coefficient is applied to the quantized coefficients of decomposition level 2 at the same coordinate position as that of the coefficient of decomposition level 3 which has been used to generate the weighting coefficient.

Next, the quantized coefficient data TQ1LH to TQ1HH of the sub-band LH, HL, and HH components, as high-frequency components, of decomposition level 1 and quantization parameters QP1LH to QP1HH of the sub-bands LH, HL, and HH of decomposition level 1 are sequentially supplied to the inverse quantizing unit 1000. On the other hand, the stored discrete wavelet coefficient data of the sub-band LL of decomposition level 3 is read out from the memory 1003, and supplied to the quantization-parameter determining unit 1002. The quantization-parameter determining unit 1002 transforms, into a weighting coefficient, the discrete wavelet coefficient data of decomposition level 3 input from the memory 1003. Similarly to the quantization-parameter determining unit 902 of the quantizing unit 900, the quantization-parameter determining unit 1002 sets a smaller value (for example, a value equal to or smaller than one) as the discrete wavelet coefficient is smaller, and sets a larger value (for example, a value equal to or larger than one) as the discrete wavelet coefficient is larger. Then, the quantization-parameter determining unit 1002 multiplies the quantization parameter input from the quantizing control unit by the weighting coefficient, thereby supplying the obtained quantization parameter to the inverse quantizer 1001 as a final quantization parameter. The discrete wavelet coefficient data TIQ1LH to TIQ1HH obtained by performing inverse quantization in the inverse quantizer 1001 are externally output. In the processing of decomposition level 2, no data is written in the memory 1003. Note that the weighting coefficient is applied to the quantized coefficients of decomposition level 1 at the same coordinate position as that of the coefficient of decomposition level 3 which has been used to generate the weighting coefficient.

As described above, the quantizing unit 900 and the inverse quantizing unit 1000 respectively perform quantization and inverse quantization of the sub-bands in an order from a low frequency to a high frequency in time series. The inversely quantized discrete wavelet coefficient of the sub-band LL components, as DC components, of decomposition level 3 is stored in the memory, and read out and transformed into weighting coefficients at the times of quantization and inverse quantization of the sub-band LH, HL, and HH components, as AC components, of the respective decomposition levels, thereby generating quantization parameters. This makes it possible to obtain the same results as those of the quantization processing and inverse quantization processing by the parallel operation according to the first embodiment.

Note that in the second embodiment, input quantization parameters QP3LH to QP3HH are used intact in quantization of the sub-band LH, HL, HH components of decomposition level 3. However, quantization parameters weighted by the inversely quantized discrete wavelet coefficient of the sub-band LL components of decomposition level 3 may be used.

Furthermore, the quantization parameter set from the quantizing control unit is multiplied by the weighting coefficient to generate a final quantization parameter. However, the weighting coefficient may be added to the quantization parameter set from the quantizing control unit to generate a final quantization parameter.

In calculation of the final quantization parameter, the final quantization parameter may be restricted by setting the lower and upper limits. For example, since a quantization parameter smaller than one sets a quantization step smaller than one, and a data amount may increase when entropy-encoding a quantized coefficient, the lower limit of the final quantization parameter is set to one.

As described above, the coefficient data of the sub-band LL of highest decomposition level n among the discrete wavelet coefficients also serves as DC component data, and is regarded as data representing the illuminance of the image. The weighting coefficient shown in FIG. 5 is calculated based on the DC component, and applied to quantization of the coefficient data (AC component data) of each sub-band of composition level n−1 or lower at the same coordinate position, thereby making it possible to reduce a decrease in resolution of a low-illuminance portion. Furthermore, since the weighting coefficient is generated from the DC component of the discrete wavelet coefficients, it is not necessary to additionally save the weighting coefficient in encoded data, and it is possible to suppress an increase in code amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-137953, filed Jul. 12, 2016, which is hereby incorporated by reference herein in its entirety.

What is claimed is:

1. An image decoding apparatus for decoding encoded image data, comprising:
    a decoding unit configured to generate quantized coefficient data of a plurality of sub-bands of up to decomposition level n (n≥2) by decoding the encoded image data;
    an inverse quantizing unit configured to inversely quantize the quantized coefficient data, obtained by decoding, in the sub-bands of the respective decomposition levels; and
    a transforming unit configured to generate image data by performing inverse discrete wavelet transform for the coefficient data, obtained by the inverse quantizing unit, in the sub-bands of the respective decomposition levels,
    wherein the inverse quantizing unit
    inversely quantizes each sub-band of decomposition level n based on a quantization parameter set for each sub-band, and
    inversely quantizes each sub-band of decomposition level n−1 or less based on a quantization parameter set for each sub-band and a weighting coefficient dependent on inversely quantized coefficient data of a sub-band LL of decomposition level n.

2. The apparatus according to claim 1, wherein the inverse quantizing unit includes
    a generating unit configured to generate a weighting coefficient from a value indicated by the inversely quantized coefficient data of the sub-band LL of decomposition level n, and
    a correcting unit configured to correct a quantization parameter set for each sub-band of decomposition level n−1 or less by multiplying the quantization parameter by the generated weighting coefficient, and the inverse quantizing unit inversely quantizes the coefficient data in each sub-band of decomposition level n−1 or less based on the quantization parameter corrected by the correcting unit.

3. The apparatus according to claim 2, wherein the generating unit generates a weighting coefficient which has a smaller value as the value indicated by the coefficient data is smaller.

4. The apparatus according to claim 1, wherein when the inverse quantizing unit inversely quantizes coefficient data of interest in a sub-band of interest of decomposition level n−1 or less, the coefficient data of interest is at the same spatial coordinates as those of the inversely quantized coefficient data in the sub-band LL of decomposition level n, which has been referred to when correcting a quantization parameter for the coefficient data of interest.

5. A control method for an image decoding apparatus which decodes encoded image data, comprising:
generating quantized coefficient data of a plurality of sub-bands of up to decomposition level n (n≥2) by decoding the encoded image data;
inversely quantizing the quantized coefficient data, obtained by decoding, in the sub-bands of the respective decomposition levels; and
generating image data by performing inverse discrete wavelet transform for the coefficient data, obtained in the inversely quantizing, in the sub-bands of the respective decomposition levels,
wherein in the inversely quantizing,
each sub-band of decomposition level n is inversely quantized based on a quantization parameter set for each sub-band, and
each sub-band of decomposition level n−1 or less is inversely quantized based on a quantization parameter set for each sub-band and a weighting coefficient dependent on inversely quantized coefficient data of a sub-band LL of decomposition level n.

6. A non-transitory computer-readable storage medium storing a program which causes an information processing apparatus to execute steps of a method for controlling the information processing apparatus which decodes encoded image data, the method comprising:
generating quantized coefficient data of a plurality of sub-bands of up to decomposition level n (n≥2) by decoding the encoded image data;
inversely quantizing the quantized coefficient data, obtained by decoding, in the sub-bands of the respective decomposition levels; and
generating image data by performing inverse discrete wavelet transform for the coefficient data, obtained in the inversely quantizing, in the sub-bands of the respective decomposition levels,
wherein in the inversely quantizing,
each sub-band of decomposition level n is inversely quantized based on a quantization parameter set for each sub-band, and
each sub-band of decomposition level n−1 or less is inversely quantized based on a quantization parameter set for each sub-band and a weighting coefficient dependent on inversely quantized coefficient data of a sub-band LL of decomposition level n.

* * * * *